United States Patent Office 3,153,101
Patented Oct. 13, 1964

3,153,101
AROMATIZATION PROCESS
Milton S. Konecky, South Plainfield, and Elroy J. Inchalik, Cranford, N.J., assignors to Esso Research and Engineering Company, a corporation of Delaware
No Drawing. Filed July 11, 1961, Ser. No. 123,098
9 Claims. (Cl. 260—668)

This invention relates to a novel process for producing aromatic hydrocarbons from unsaturated naphthenic hydrocarbons. More particularly, this invention relates to a process for aromatizing unsaturated $C_6$ to $C_{20}$ naphthenic hydrocarbons in the presence of bulk liquid polyphosphoric acid.

Heretofore, the production of aromatic hydrocarbons from nonaromatic hydrocarbons has been accomplished by high temperature isomerization and/or dehydrogenation reactions in the presence of solid catalysts such as are employed in the polymerization of olefins. Exemplary of such catalysts are those produced by impregnating a porous solid carrier with a catalytically active component, e.g. phosphoric acid or metal salts thereof, calcining or drying the impregnated carrier, and pelletizing or crushing the dried material to obtain particles of suitable size. Catalysts thus prepared are generally used as a fixed bed over which vapors of the hydrocarbon feed to be aromatized are passed at temperatures ranging upwards of 500° to 750° F. (see, for example, U.S. 2,347,955). It has also been reported that terpenes and similar monocyclic dienes are aromatized by heating in an autoclave with dilute aqueous solutions of acid-acting catalysts, e.g. salts such as magnesium chloride or mineral acids such as phosphoric acid (U.S. 2,420,749).

It has now been found that certain cyclic unsaturated nonaromatic hydrocarbons are surprisingly converted to aromatic hydrocarbons by intimately contacting the liquid hydrocarbon at ambient or moderately elevated temperatures and atmospheric pressure with liquid bulk polyphosphoric acid.

Generally speaking, the cyclic unsaturated nonaromatic hydrocarbons which are aromatized in the present process are unsaturated $C_6$ to $C_{20}$ naphthenic hydrocarbons having at least one olefinic double bond and a carbocyclic ring of from 6 to 12 carbon atoms. The required olefinic unsaturation may be within the carbocyclic ring structure or may be contained in a hydrocarbon substituent bonded to the carbocyclic ring, or when more than one such unsaturation is present, both the ring and the substituent may contain olefinic double bonds. Both mononuclear and polynuclear naphthenic hydrocarbons having the required carbocyclic ring structure and olefinic unsaturation are suitable in the present process. By way of illustration may be mentioned mono and polyolefinic and mono and polycyclic cycloalkene hydrocarbons such as cyclohexene, cyclooctene, cyclooctadiene, cyclodecene, cyclododecene, cyclododecatriene, indan, tetralin, octahydronaphthalene, octahydroacenaphthene and the like, alkyl- and alkenylcycloalkenes such as methylcyclohexene, butylcyclohexene, vinylcyclohexene, propenylcyclohexene and the like, and the alkenylcycloalkanes such as vinylcyclohexane, trivinylcyclohexane, propenylcyclohexane, pentenylcyclohexane, and the like.

The polyphosphoric acid catalyst utilized in the present invention is a viscous liquid comprising a complex mixture of acids of phosphorous which may be characterized as a reaction product or solution of ortho phosphoric acid and phosphorous pentoxide. The commercial acid has a theoretical $P_2O_5$ content of between 81 and 85%, and predominantly comprises a mixture of linear polyphosphoric acids with lesser amounts of ortho and pyrophosphoric acids. Reference may be had to Chemical Reviews, vol. 58, pp. 322–326, 1958, for a further description of this catalyst.

The amount of polyphosphoric acid utilized in the present process is not critical and amounts varying from 0.1 to 10 times the amount by weight of the hydrocarbon may be used. Generally, however, the ratio of acid to hydrocarbon will be in the range of 1 to 8 with excess amounts of acid, e.g. weight ratios of between 3 and 6 being preferred.

The present aromatization process can be accomplished at relatively low temperatures. Temperatures as low as room temperature, e.g., 25° C., may be used; however, moderately elevated temperatures are preferred, e.g. between 90° C. to 200° C., with temperatures between 130° C. and 160° C. being especially preferred.

The reaction may be carried out in the absence of solvents, although for purposes of controlling the reaction temperature, it may be desirable to employ a solvent. Suitable solvents include aromatic hydrocarbons such as toluene, xylene, and the like.

The reaction is carried out by intimately contacting the hydrocarbon to be aromatized and the polyphosphoric acid catalyst. This may be accomplished by admixing the hydrocarbon and catalyst with good agitation. The order of addition is not critical although generally it is more convenient to add the hydrocarbon to the acid. The reactants can be mixed and then heated to the desired temperature, or the hydrocarbon can be added in portions to the preheated acid. After intimate contact of the hydrocarbon with the acid at the desired temperature for from 0.5 to 8 hours, the acid layer is allowed to settle by gravity or by centrifugation, and the hydrocarbon layer separated therefrom. In this way, the polyphosphoric acid may be used directly for further reaction. Alternatively, the reaction mixture may be diluted with water, and the diluted mixture extracted with ether or other suitable solvent to separate the product. In either event, the product is washed with water and dilute alkali to remove residual acid, dried, and then subjected to distillation or other purification process.

The present process is illustrated further by the following specific examples.

Example I

Polyphosphoric acid (1800 g.) was heated to 150° C. in a flask equipped with a condenser, thermometer, stirrer, and additional funnel. Cyclododecatriene (for the preparation of this material, see, for example, Belgian Patent No. 555,180) (590 g.) was slowly added to the stirred acid over a 1-hour period. After the addition of hydrocarbon was completed, the reaction mixture was stirred vigorously for an additional 3 hours at 140–160° C. The mixture was permitted to cool to about 100° C. and then poured into 2 kg. of ice. After the mixture had warmed to room temperature, the organic and aqueous layers were separated. The organic product, after being washed with dilute sodium hydroxide and water, was dried and distilled under vacuum. About 24 g. of a pale yellow solid (M.P. 85–92° C.) was recovered. Recrystallization of this product gave a solid, M.P. 93–94° C., which was identified as acenaphthene by elemental analysis and mixed melting point with an authentic sample.

Example II

The aromatization of 24.3 g. of trivinylcyclohexane in 147 g. of polyphosphoric acid was carried out at 150–155° C. in accordance with the procedure of Example I. Vacuum distillation of the organic product yielded 11.2 g. of product which was identified as triethylbenzene by its infrared spectrum.

Example III

In accordance with the procedure described in Example I, 65.6 g. of octahydroacenaphthene was aromatized in 201 g. of polyphosphoric acid at 150° C. over a 2½ hour period. The organic reaction products were distilled under vacuum to yield a yellow solid, M.P. 93–94° C., which was identified as acenaphthene.

Having thus described the general nature and specific embodiments of the present invention, the true scope is now particularly pointed out in the appended claims.

What is claimed is:

1. A process for producing an aromatic hydrocarbon which comprises intimately contacting an unsaturated non-aromatic $C_6$ to $C_{20}$ cyclic hydrocarbon having at least one olefinic double bond and a carbocyclic ring of from 6 to 12 carbon atoms with 0.1 to 10 parts by weight of a liquid bulk polyphosphoric acid at a temperature of 25 to 200° C.

2. A process according to claim 1 in which said cyclic hydrocarbon has from 1 to 3 olefinic double bonds.

3. A process according to claim 1 in which the weight ratio of said polyphosphoric acid to cyclic hydrocarbon is between 1 and 8.

4. A process for producing an aromatic hydrocarbon which comprises intimately mixing an unsaturated non-aromatic $C_6$ to $C_{20}$ cyclic hydrocarbon having from 1 to 3 olefinic double bonds and a carbocyclic ring of from 6 to 12 carbon atoms, said unsaturated cyclic hydrocarbon being selected from the group consisting of cycloalkenes, alkylcycloalkenes, alkenylcycloalkanes and alkenylcycloalkenes, with at least an equal amount by weight of liquid bulk polyphosphoric acid at a temperature between 90° and 200° C.

5. A process according to claim 4 in which said temperature is between 130° and 160° C.

6. A process according to claim 4 in which said cyclic hydrocarbon is trivinylcyclohexane.

7. A process according to claim 4 in which said cyclic hydrocarbon is cyclododecene.

8. A process according to claim 4 in which said cyclic hydrocarbon is cyclododecatriene.

9. A process according to claim 4 in which said cyclic hydrocarbon is octahydroacenaphthene.

References Cited in the file of this patent

UNITED STATES PATENTS 2,420,749    Ipatieff et al. _____ May 20, 1947